United States Patent [19]
Klutchko et al.

[11] 3,906,005
[45] Sept. 16, 1975

[54] 3-NITROCHROMONES

[75] Inventors: Sylvester Klutchko, Hackettstown; Maximilan von Strandtmann, Rockaway Twp., both of N.J.

[73] Assignee: Warner-Lambert Company, Morris Plains, N.J.

[22] Filed: Apr. 11, 1974

[21] Appl. No.: 460,255

[52] U.S. Cl. ............................ 260/345.2; 424/283
[51] Int. Cl.² ...................................... C07D 311/22
[58] Field of Search ................................ 260/345.2

[56] References Cited
OTHER PUBLICATIONS

Houben-Weyl, "Methoden der Organischen Chemie," George Thieme Verlag, Stuttgart, (1971), pp. 829–830.

*Primary Examiner*—G. Thomas Todd
*Attorney, Agent, or Firm*—Albert H. Graddis; Frank S. Chow

[57] ABSTRACT

3-nitrochromones are disclosed. These chromones have the following structural formula:

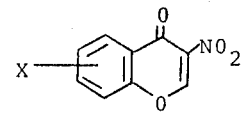

wherein X is hydrogen, halogen, nitro, phenyl, acetyl or methylsulfonyl. These compounds are useful as antifungal agents.

3 Claims, No Drawings

3-NITROCHROMONES

The present invention relates to 3-nitrochromones having the following structural formula:

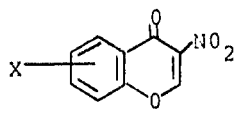

I wherein X is hydrogen, halogen, nitro, phenyl, acetyl or methylsulfonyl.

This invention also includes within its scope novel processes for the production of these 3-nitrochromones.

The compounds of this invention exhibit antifungal activities. For example, the compound of Type I wherein X is 6-chloro has the minimal inhibitory concentration of 62.5 mcg/ml against *C. albicans* and 3.9 mcg/ml against *T. menta*.

These compounds are indicated in the treatment of dermatalogical infections caused by the aforesaid fungus. Generally speaking, the compounds are formulated with a topically acceptable vehicle such as talc or petrolatum in which the active ingredient may vary from 0.1% – 10% by weight. These dosage forms are applied liberally to the site of infection.

According to the present invention, compound I is produced by treating a compound of the formula

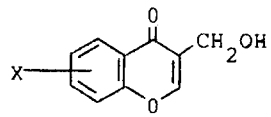

II with concentrated nitric acid at a temperature of 38°–42°.

Alternatively, the compounds of this invention are produced by treating a compound of formula III, which is an intermediate in the above reaction, with concentrated nitric acid.

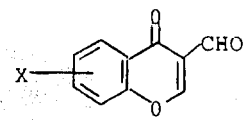

III

Starting compound II is disclosed in U.S. Pat. No. 3,798,240. Starting compound III is disclosed in co-pending application Ser. No. 352,149, filed Apr. 18, 1973.

The compounds of this invention will undergo further reactions to yield other chromone derivatives. Thus, for example, when these compounds are reduced 3-aminochromones of the formula

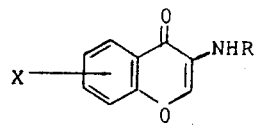

IV in which R is hydrogen are obtained.

Compound IV can also undergo reactions. For example, upon acylation there is obtained compounds corresponding to structure IV in which R is acetyl or benzoyl.

In order to further illustrate the practice of this invention, the following examples are included:

EXAMPLE 1

6-Chloro-3-nitrochromone

At room temperature with stirring, a quantity of 38.4 g (0.183 mole) of 6-chloro-3-(hydroxymethyl)chromone was dissolved in 500 ml of 70% nitric acid. In the first 15 min. the temperature rose to 34°. At the end of 0.5 hr. the temperature was 40°. At this point the temperature was maintained at 38°–42° with cooling (caution: temperature rises rapidly above 42°). After 5 min. at 38°–42° crystals began to separate. After 1 hour total reaction time, the mixture was cooled to room temperature and the separated solid was filtered and washed with 30 ml of conc. nitric acid, absolute ethanol and then ether; wt 26.5 g (65.4%); mp 215°–217°. Recrystallization from dioxane gave pure 6-chloro-3-nitrochromone; mp 216°–218°.

Anal. Calcd for $C_9H_4ClNO_4$: C, 47.92; H, 1.79; N, 6.21; Cl, 15.72. Found: C, 47.82; H, 1.77; N, 6.22; Cl, 15.94.

EXAMPLE 2

6-Bromo-3-nitro-chromone

METHOD A: From 6-bromo-3-(hydroxymethyl)-chromone. This compound was prepared by a procedure similar to that for preparing 6-chloro-3-nitrochromone, % yield, 69; mp 219°–221°. Recrystallization from dioxane gave pure 6-bromo-3-nitrochromone; mp 221°–223°.

Anal. Calcd for $C_9H_4BrNO_4$: C, 40.03; H, 1.49; N, 5.19; Br, 29.59. Found: C, 40.07; H, 1.49; N, 5.10; Br, 29.41.

METHOD B: From 6-bromo-3-formylchromone.

A quantity of 6.0 g (0.0237 mole) of 6-bromo-3-formyl chromone was dissolved in 30 ml of 70% nitric acid at room temperature. After 15 minutes the temperature rose to 40°. Solid separated. The mixture was allowed to cool and stand overnight. The precipitate was collected, washed with 10 ml of conc. nitric acid and 20 ml of water and dried; wt 2.0 g (31%); mp 220°–222°. Recrystallization from dioxane gave pure 6-bromo-3-nitrochromone; mp 221°–223°.

EXAMPLE 3

3-Amino-6-chlorochromone hydrochloride

A mixture of 7.5 g (0.033 mole) of 6-chloro-3-nitrochromone, 250 ml of N,N-dimethylformamide (DMF) and 0.5 g of 10% Pd/c was hydrogenated at low pressure until uptake of hydrogen had ceased (one hour). The catalyst was filtered and the DMF was stripped off at reduced pressure. Methanol (75 ml) was added to the residue and the mixture was treated with excess hydrogen chloride gas. Most of the solid dissolved. Ether (75 ml) was added to precipitate 4.0 g (52.2%) of crude hydrochloride. Recrystallization from methanol-ether gave pure 3-amino-6-chlorochromone hydrochloride; mp 225°–227° (dec).

Anal. Calcd for $C_9H_6ClNO_2 \cdot HCl$: C, 46.58; H, 3.04; N, 6.04. Found: C, 46.44; H, 3.07; N, 6.06.

EXAMPLE 4

N-(6-chloro-4-oxo-4H-1-benzopyran-3-yl)benzamide

A stirred mixture of 2.0 g (0.012 mole) of 3-amino-6-chlorochromone base, 260 ml of chloroform and 100 ml of 20% aqueous potassium carbonate was treated with 2.0 g (0.015 mole) (20% excess) of benzoylchloride. The mixture was maintained at reflux for one hour and then stirred at room temperature overnight. The organic phase was separated, dried ($K_2CO_3$), charcoaled, filtered and concentrated. The residue was triturated with 50 ml of ether to give the benzamide; wt 2.8 g (78%); mp 183°–186°. Recrystallization from ethyl acetate gave pure, pale yellow crystals; mp 187°–189°.

Anal. Calcd for $C_{16}H_{10}ClNO_3$: C, 64.12; H, 3.36; N, 4.67. Found: C, 63.85; H, 3.35; N, 4.65.

EXAMPLE 5

N-(6-chloro-4-oxo-4H-1-benzopyran-3-yl)acetamide

A solution of 3.0 g (0.015 mole) of crude 3-amino-6-chlorochromone (immediately from the catalytic reduction of the 6-chloro-3-nitrochromone) in 60 ml of acetic anhydride was maintained at reflux for 15 min. Water (30 ml) was added and the mixture was stirred for 15 minutes. The separated solid was filtered, washed well with water and dried; wt 3.0 g (85%); mp 220°–222°. Recrystallization from ethyl acetate gave pure, white crystals of the acetamide; mp 221°–223°.

Anal. Calcd for $C_{11}H_8ClNO_3$: C, 55.60; H, 3.39; N, 5.89. Found: C, 55.58; H, 3.35; N, 6.02.

We claim:

1. A compound of the formula

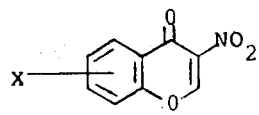

I wherein X is hydrogen, halogen, nitro, phenyl, acetyl or methylsulfonyl.

2. A compound according to claim 1 which is 6-chloro-3-nitrochromone.

3. A compound according to claim 1 which is 6-bromo-3-nitrochromone.

* * * * *